United States Patent [19]

Ess

[11] 4,064,783
[45] Dec. 27, 1977

[54] PRESSURE-BALANCED UNDERWATER STRUCTURAL RELEASE SYSTEM

[75] Inventor: John O. Ess, Alexandria, Va.

[73] Assignee: The United States of America as represented by the Secretary of the Navy, Washington, D.C.

[21] Appl. No.: 763,209

[22] Filed: Jan. 27, 1977

[51] Int. Cl.$^2$ .................................. F16B 37/00
[52] U.S. Cl. ........................... 85/33; 85/DIG. 1; 89/1 B
[58] Field of Search ............... 85/33, DIG. 1; 89/1 B

[56] References Cited

U.S. PATENT DOCUMENTS

| 3,196,745 | 7/1965 | Sustrich et al. | 85/DIG. 1 |
| 3,262,351 | 7/1966 | Webb | 85/33 |
| 3,520,223 | 7/1970 | Lilly | 85/33 X |
| 3,813,984 | 6/1974 | Selinder | 85/33 |
| 3,910,154 | 10/1975 | Gardner | 85/33 |
| 3,926,090 | 12/1975 | Bunker | 85/33 |
| 4,002,120 | 1/1977 | Swales | 85/DIG. 1 |

FOREIGN PATENT DOCUMENTS

| 1,147,227 | 4/1969 | United Kingdom | 85/33 |

Primary Examiner—Ramon S. Britts
Attorney, Agent, or Firm—R. S. Sciascia; Philip Schneider; Melvin L. Crane

[57] ABSTRACT

A pressure-balanced separation nut for releasably engaging a threaded element. The separation nut includes nut segments which are housed within the cavity of a housing and are held in an assembled element-engaging condition by a slidable piston and a piston ring which surrounds the nut segments. A buffer piston bottoms within the slidable piston and has a conical face which slopes toward the axis and rests upon the inner ends of the nut segments. Fluid pressure is exerted on the inner face of the slidable piston to move it sufficiently in an axial direction to permit radial movement of the nut segments thereby quietly releasing the threaded element without the requirement of unthreading the threaded element. The conical face of the buffer piston forces the nut segments radially outward to aid in their separation from the threaded element. The device is provided with a fluid confining area relative to the slidable piston in combination with a pressure-balanced piston which is acted upon by the surrounding pressure to provide a pressure-balanced system which prevents undesired release of the threaded element.

8 Claims, 2 Drawing Figures

PRESSURE-BALANCED UNDERWATER STRUCTURAL RELEASE SYSTEM

This invention is directed to a nut-releasing device and more particularly to a pressure-balanced nut-releasing device which prevents unintentional self-activation due to a pressure imbalance.

Separation nuts are well known in the prior art and are formed by the use of a plurality of nut segments. Their function is to engage and hold a threaded element until it is desired to release the threaded element, at which time, instead of being unthreaded, fluid pressure is exerted on a movable member which quietly releases the plurality of nut segments from their engagement with the threaded element. Several patents have issued for various arrangements of parts; these are U.S. Pat. Nos. 3,120,149; 3,170,363; 3,265,408; 3,176,573; 3,268,928; 3,261,261; 3,331,278; 3,910,154; and 3,813,984. Prior-art separation-nut devices include sealed housings in which problems arise in removal of the threaded element due to required additional energy. Also, these devices are noisy. Other problems arise in free-flooded nut-separator devices because of an imbalance in pressure on the control elements. An imbalance of pressure may permit unintentional release which could be hazardous.

Many structural release systems are designed for high holding forces even though the units may experience such forces for only a short period of time. To avoid differential pressure on a threaded element in a sealed system, it is desirable to have a free-flooded system. Since the release device may be used in different fluids at different pressures, it is desirable to have a release mechanism which can be pressure-balanced to avoid an intentional release.

SUMMARY OF THE INVENTION

The nut separation system of this invention makes use of a pressure-balancing piston in a free-flooded system. A piston on one end is depressed into the separation device by the outside fluid. The piston acts against a fluid within the assembly to prevent movement of the control elements due to free-flooding pressure from the free-flooded nut assembly side of the device. Since the outside pressure acts on each side of the control elements, they will not move until desired by introduction of further pressure into the assembly which operates the nut-assembly holding elements.

DETAILED DESCRIPTION

Figure 1:
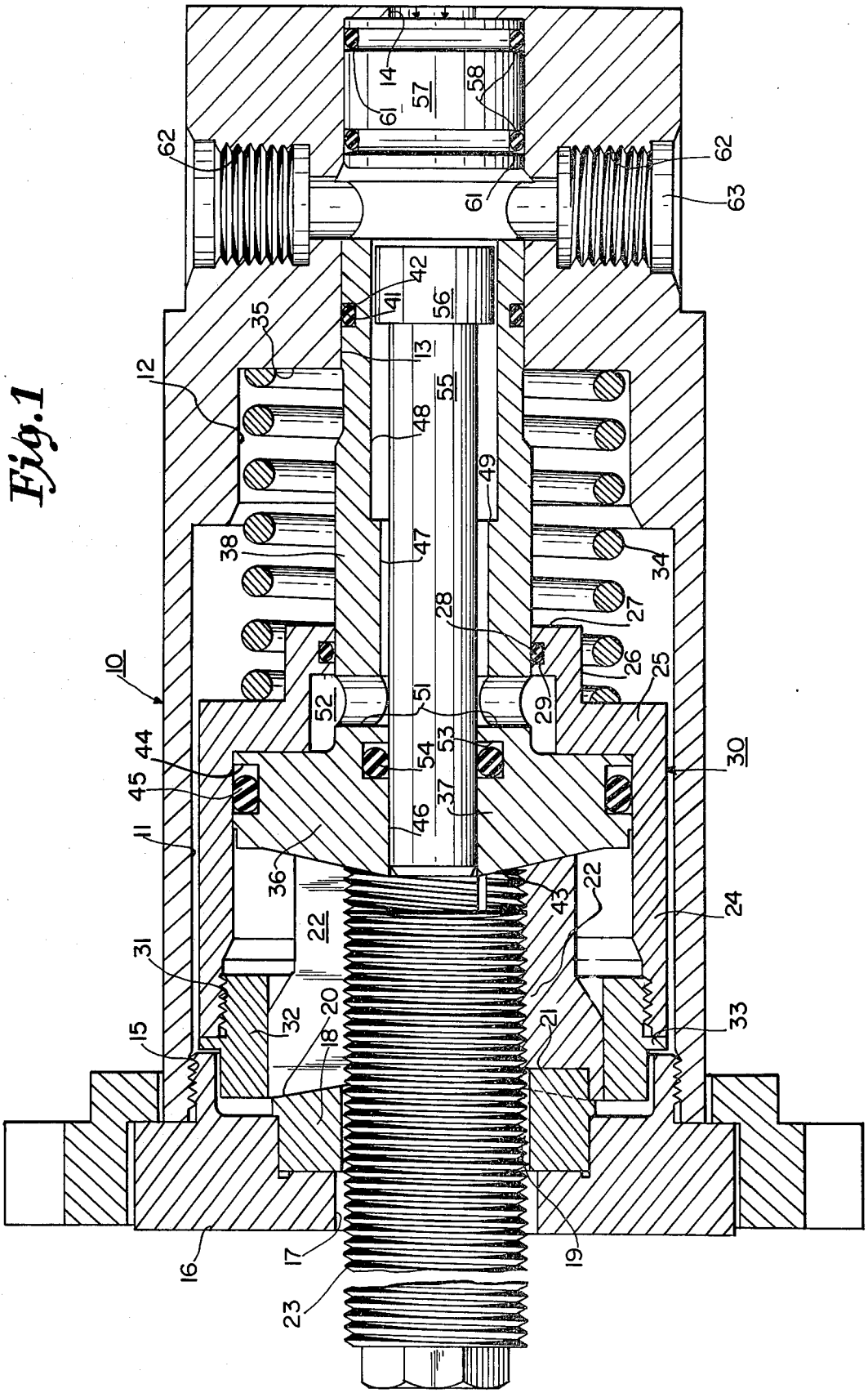
FIG. 1 is a cross-sectional view along the length of the assembly across the center thereof.

The drawing illustrate a cylindrical housing 10 which has a cavity along its linear axis which is formed by four separate sections, 11, 12, 13 and 14, each with differently sized inner diameters. Housing portion 11 includes threads 15 along a portion of its inner surface at the end thereof. A base 6 is threaded onto the housing and includes an axially aligned aperture 17 therein.

A seat member 18 is secured within a cutout in the base around the aperture and has smooth aperture 19 coaxial with the aperture 17 in the base and with the housing. The face 20 on the cavity side of the seat member is generally frustoconical and tapers outwardly from the axis of the cavity. The seat member is provided with three keys 21 or antirotation devices (two of which are not shown) which extend inwardly into a slot in the end of the nut segments 22 to prevent rotation of the three or more nut segments, two of which are shown in their normal position for securing a threaded element 23 therein. The seat member and keys could be made integral with the base, as a part of the base, if desired.

The nut segments 22 are formed from an internally threaded tubular body with conical ends. One end of the tubular body has a slope which is complementary to that of the face of the seat member and the other end has a slope which complements the slope of the face of a buffer piston 36 (which tapers in the radially outward direction). The external surface of the tubular body has one end which is of greater diameter than the other end. A chamfer between the two ends provides a smooth transition from one diameter surface to the other. The greater-diameter end is adjacent the base seat member. The tubular body is sawed or otherwise cut along is length into three or more segments of which the peripheral extent of any one of the segments should not be more than 120°. The outer shape of the nut segments is such that the larger end is locked into place by a locking piston ring 32 and the smaller-diameter portion permits an outward movement of the segments as the locking piston ring is moved from its locking position into the area surrounding the smaller-diameter portion of the segments.

In order to use the least amount of activation pressure for release of the threaded segments and to reduce damaging shock waves and noise, a buttress thread is used on the nut segments. The buttress thread has a shallower thread angle which produces less lateral thrust on the nut segments resulting in lower friction forces that have to be overcome to move the lock ring, resulting in lower attendant inertial force.

As piston cylinder 30 fits within the housing cavity and has a tubular portion 24 that extends along the inner wall of the housing, a first, transverse, annular head portion 25 that extends toward the axis, a smaller-diameter portion 26 that extends axially from the first, transverse annular portion, and a second, transverse, upwardly extending portion 27 which is provided with an O-ring seal 28 and an O-ring set 29.

The tubular portion 24 of the piston cylinder is threaded on its lower end 31 and receives therein a threaded piston ring 32 which is coaxial with the large-diameter end of the nut segment, the inside diameter of the piston ring 32 being substantially the same as the larger diameter portion of the nut segments which it surrounds. The piston ring locks the nut segments in place and is provided with an outwardly extending shoulder 33 against which the threaded end 31 of the piston cylinder abuts. Also, the lower side (left side in FIG. 1) of the piston ring shoulder abuts the base portion which is threaded onto the housing.

The piston cylinder is movable axially within the housing and the piston ring moves along with the piston cylinder. As the piston cylinder moves forward, away from the base (i.e., back) end, the piston ring moves relative to the nut segments into the space around the portion of the nut segments with the least outside diameter. The nut segments include a chamfer between the larger-diameter portion and the smaller-diameter portion for easier transfer of the piston ring from the locking position to the unlocked position. As the locking piston ring moves axially, the nut segments are permitted to move outwardly away from the threaded element to release the threaded element. A spring 34 is positioned between the first transverse annular portion 25 of the piston cylinder and wall 35 of the housing to return the piston cylinder to the nut segment locking position, as shown in the drawing, subsequent to operation thereof for release of the threaded bolt.

A buffer piston 36 includes a piston head 37 and a piston rod 38. The rod 38 extends into the lesser diameter portion 13 of the housing and is provided with an O-ring 41 and an O-ring seat 42 to prevent leakage of fluid thereby. The piston heat 37 has an abutment face 43 which is complementarily tapered relative to the abutting ends of the nut segments and is provided with a peripherial groove which receives an O-ring seal 45 therein. The outer diameter of the piston head is substantially the same as the inside diameter of the piston cylinder portion 24. Therefore, the O-ring provides a fluid-tight seal between the piston head and the adjacent piston cylinder wall. The buffer piston is provided with an axially extending aperture along its entire length. The aperture is formed with three sections 46, 47 and 48 of different diameters, the smallest-diametered aperture extending through the piston head at it forward end and the largest-diametered aperture lying along the back end of the buffer piston. The largest-diameter section forms a shoulder 49 at the junction with the intermediate diameter section 47.

A passage 51 is drilled across the diameter of the piston rod just above the piston head 36 to permit fluid flow along the aperture and out through the passage into the area 52 between the buffer piston head, the piston rod, and the transverse annular head of the piston cylinder. The inner diameter 46 of the buffer piston head is provided with an O-ring seat 53 and an O-ring 54 which provides a seal with an ejection rod 55 which is placed in the aperture. The ejection rod has a long body portion and extends through the aperture in the buffer piston and is provided with a head 56 on the end away from the buffer piston head. The head 56 is larger than the intermediate diameter section 47 of the aperture so that the ejection rod cannot move beyond the shoulder 49. The O-ring 54 in the seat on the inner diameter of the buffer piston prevents leakage of fluid between the inner diameter surface of the buffer piston and the surface of the ejection rod. As seen in the drawing, there is a small spacing between the aperture wall 47 and the body of the rod 55. This spacing acts to restrict fluid flow to provide some metering of the release pressure during release of the nut segments. Thus, the locking piston ring slides off the nut segments smoothly. An end-closure piston 57 with a pair of -rings 58 in peripheral grooves 61 therein is placed in the housing between the open end 14 and the end of the buffer piston rod and the ejection rod head 56. The piston closes the open end 14 while permitting surrounding fluid to act upon the piston.

The thicker end 13 of the housing is provided with opposing apertures 62 which are used to receive a pressure source such as a squib 63. Squibs for this purpose are well known in the art, one such squib being described in U.S. Pat. No. 3,135,200. A squib may be placed in each opening, as shown, to provide more release pressure for the threaded-element 62 or in one opening for less release pressure. Two squibs also provide a back-up squib just in case one does not operate when fired.

The opening 17 in the base through which the threaded element passes and the aperture 19 in the seat member are slightly larger than the diameter of the threaded element to permit freedom of axial movement and to ensure an easy rerelease of the threaded element. The housing is mostly open to the surrounding fluid therefore the spacing between the housing wall and the piston cylinder is not critcal; however, a spacing is maintained so that fluid from the surrounding medium may enter the housing and can be found within and forward of the piston cylinder.

Once the device has been assembled, a fluid such as oil is added to the area between the end closure piston 57, the ejection rod 55, and the area 52 between the front of the buffer piston and the piston cylinder portion 27 in the vicinity of the transverse aperture 51 through the buffer piston rod. The fluid added to the housing will not leak out nor will surrounding fluid leak into the area of the added fluid because of the O-rings encircling the various elements.

On assembly, the open end closure piston 57 is forced into the end area 13 of the housing to close the open end 14. The piston cylinder 30 with the restraining spring 34 is pushed into the housing. The ejection rod 55 is placed in the axial aperture of the buffer piston; then the buffer piston with the ejection rod therein is passed through the piston cylinder and the forward end of the piston rod 38 is forced into the housing passage 13. The piston ring 32 is threaded onto the end 31 of the piston cylinder and then the nut segments 22 are inserted into place. The seat member 18 is then placed adjacent the nut segments with the retainer keys 21 in the slots of the nut segments. The base 16 is then threaded onto the end 15 of the housing. If only one squib 63 is to be used, for example, the other opening 62 or openings in the housing are closed and oil or other fluid is admitted through the opening in which the squib is secured. Once the area 52, passage 51, the spacing between the ejection rod and the aperture wall of the piston rod, and the area between ejection rod head 56 and piston 57 is filled with oil or other fluid, the squib 63 is secured into the housing opening.

The separation nut device is now ready to secure a desired object in place by threading the threaded element into the threaded nut segments. The threaded element is restricted from threading against the piston because it could energize the device. Structure for securing something to the separation nut is well known in the art and shown by U.S. Pat. No. 3,910,154 as well as other patents previously mentioned above. The piston ring will prevent the nut segments from spreading apart and the threaded nut segments will secure the threaded element in place. Of course, during assembly, the O-rings must be placed in the necessary places as required.

During operation, fluid from the surrounding medium will enter the housing in the vicinity of the nut segments and the piston cylinder. Surrounding pressure will also be applied onto the forward-end closure piston forcing it inwardly as the pressure builds up on the outside. The piston pressurizes the fluid added to the housing to counteract the pressure of the surrounding fluid entering the housing through any openings to the surrounding fluid. Therefore, the pressure on all surfaces of the piston cylinder and buffer piston will be equalized and will be the same as the surrounding fluid pressure.

When it is desired to release the threaded element, the squib is fired. Gaseous pressure produced by the squib forces the end closure piston toward the open end of the housing closing the open end and applies pressure on the ejection rod which is in contact with the forward end of the threaded element. Simultaneously, the pressure is applied to the forward end of the buffer piston forcing the buffer piston under pressure against the forward ends of the nut segments. Since the nut segments have a sloping end, the buffer piston reacts to force the ends of the nut segments radially outward away from engagement with the threaded element. As the squib pressure builds up, the pressure in the area 52 opposite the aperture 51 through the buffer piston rod and under the piston cylinder forces the piston cylinder in a direction toward the open end 14 of the housing against the resistant spring. As the piston cylinder moves forward axially, the nut segment locking piston ring also moves forward axially relative to the nut segments. The piston ring clears the large-diameter portion of the nut segments permitting the nut segments to move radially outward from the threaded element. Simultaneous with movement of the piston cylinder and the nut-segment locking piston ring, the ejection rod is forced axially against the inner end of the threaded element to force the threaded element out of the nut assembly. The ejection rod head 56 is forced against the shoulder 49 which acts as a stop for the rod. Once the squib expends its pressure production, and the threaded element has been released, the spring 34 will force the piston and locking ring into its locking position so that it is ready for securing another threaded element therein.

One of the apertures 62 in the housing may include a valve by which pressure may be released from the pressure area subsequent to release of the threaded element. The valve could be used for bleeding the system and also for addition of oil.

Figure 2:
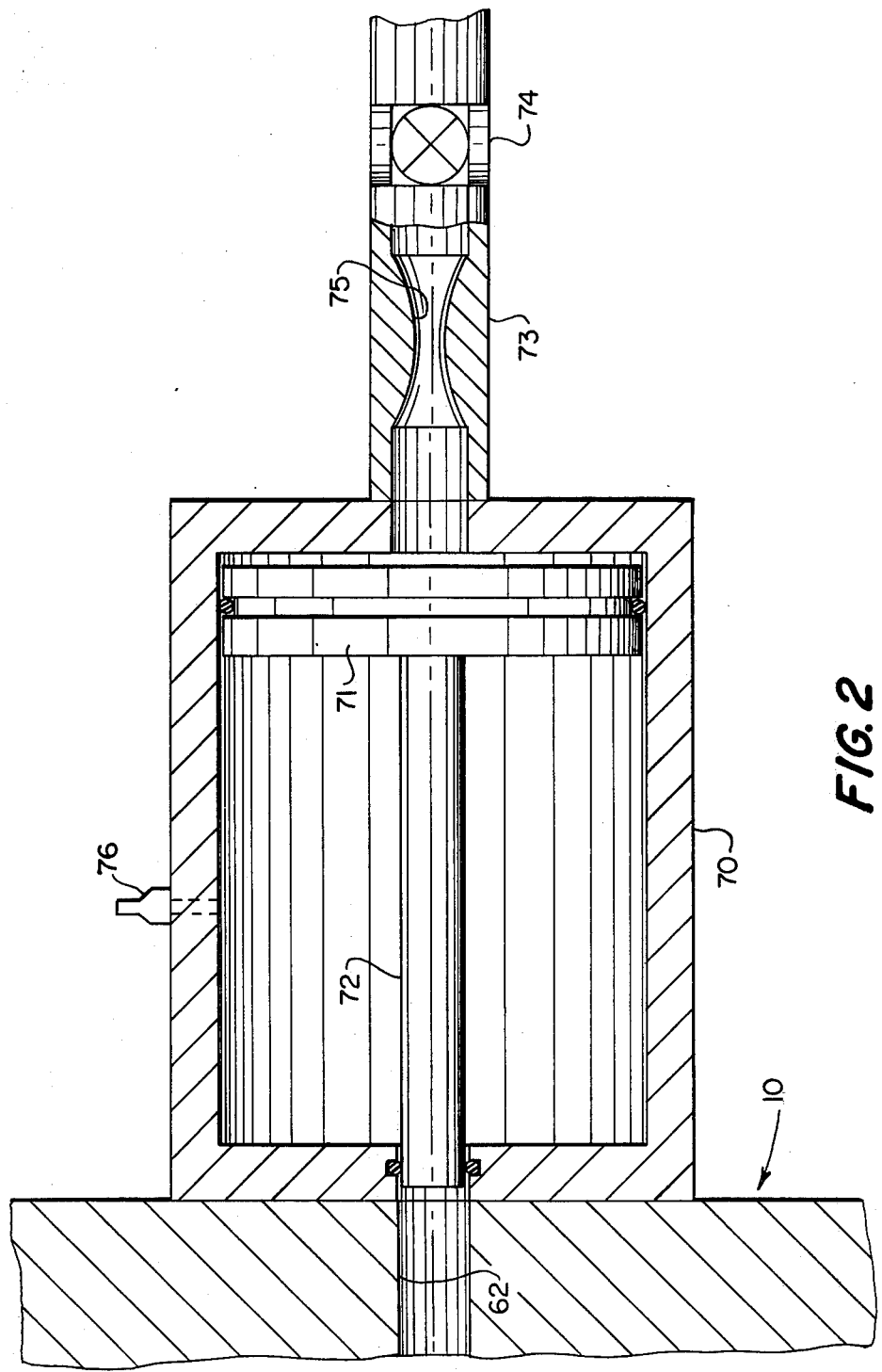
FIG. 2 illustrates a valve-piston means for applying pressure for operation of the nut segments.

In FIG. 1, there is shown a squib for producing gas under pressure which moves the piston for release of the threaded element. Other means may be used. There are situations in which one demands a real, real, quiet operation of the release element so that no noise is produced. FIG. 2 illustrates a valve-controlled surrounding-water-actuated piston-pressure energizing device. As shown, the device includes a cylinder or housing 70 connected to the housing 10 of the release mechanism at the opening 62 thereby replacing the squib. The cylinder or housing 70 includes a piston with a large piston head 71 and a piston rod 72 with a much smaller diameter. The piston rod passes through the housing 70 and into opening 62 of the release mechanism 10. A pipe 73 connected to the opposite end of housing 70 includes a remote control valve 74 therein which opens the pipe to the surrounding medium. The pipe 73 also includes a restriction 75 therein which permits the surrounding medium to be slowly metered into the cylinder. The piston housing may be remotely removed from the housing 10 and an oil filled pipe connected between the two housings, if desired.

Admission of the surrounding medium slowly into the cylinder 70, permits pressure to build up slowly thereby slowly moving the piston rod into the release cylinder which increases the pressure inside the release cylinder. As the pressure builds up inside the release cylinder, the cylinder moves the lock-ring to release the segmented nut elements.

Since the piston head has a larger area than the area of the end of the piston rod, the pressure on the piston head due to the surrounding medium will force the smaller-area piston rod into the release mechanism thereby building up pressure in the release mechanism. The piston will move slowly due to the restriction in the inlet-valve controlled line. With such a pressure device there is no need for any additional pressure means and the surrounding medium can be used to build up the necessary control pressure to energize the release mechanism. Since the surrounding water is used to supply the additional pressure there is no noise.

Valve 76 has been added to evacuate the housing 70 or to bleed the housing or for what ever use it may serve.

A certain amount of energy is expended to move the cylinder and locking-ring due to friction between the locking-ring and the large-diameter portion of the nut segments. In order to reduce the friction, a linear bearing may be placed between the locking-ring and the nut segment. Such bearings may be a plastic insert or an array of ball bearings.

Obviously many modificationa and variations of the present invention are possible in light of the above teachings. It is therefore to be understood that within the scope of the appended claims the invention may be practiced other than specifically described.

What is claimed and desired to be secured by letters patent of the United States is:

1. A pressure-balanced separation-nut device for releasably engaging a threaded element coaxial with the linear axis of the device which comprises:

a housing forming an internal cavity, said internal cavity including first, second, third and fourth sections each of lesser diameter in successive order progressing toward the forward end of said housing, said fourth section forming an open end in said housing;

a base secured to the back end of said first section of said housing;

said base including an axial aperture therein;

a seat member secured to said base member coaxial therewith, extending into said cavity, and having an aperture with substantially the same diameter as the aperture in said base member;

a segmented threaded nut within said first section of said cavity juxtaposed said seat member and coaxial with said cavity in said housing;

a piston cylinder encircling said segmented nut;

said piston cylinder including an axially extending cylindrical portion and first and second transverse annular end walls extending radially inward, the second wall being forward of the first wall;

a piston ring secured to one end of said axially extending cylindrical portion of said piston cylinder between the inner surface of said piston cylinder and the outer surface of said segmented nut to form a locking means for said nut segments;

said piston ring locking said segmented nut in place to receive said threaded element;

a buffer piston including a piston head and a piston rod extending forward from said piston head with an axial aperture extending through said buffer piston and having a transverse aperture across its diameter near said piston head and opposite said first transverse annular wall of said piston cylinder;

said piston head positioned within said piston cylinder between said nut segments and said first transverse annular wall of said piston cylinder, said piston head having an outside diameter substantially equal to the inside diameter of said piston cylinder with a face contoured to that of said segmented nut adjacent thereto;

said piston rod extending through said second transverse annular wall of said piston cylinder and secured within said third cavity section of said housing coaxial therewith;

a space bounded by said piston rod, said piston cylinder, said second transverse wall of said piston cylinder and said buffer-piston head, said transverse aperture connecting with said space;

an ejecting rod coaxially positioned within said aperture in said buffer piston for relative movement therein for ejection of said threaded element, said ejecting rod having a head at the end thereof remote from said buffer-piston head;

an end-closure means within said fourth cavity section of said housing and positioned between said ejection rod and said open end in said housing, said end-closure means comprising a piston exposed to the surrounding medium, means for permitting axial movement of said end-closure means within said housing prior to and during release of the threaded element;

sealing means to prevent leakage between said buffer piston and said piston cylinder, between said piston head and said ejection rod, between said piston rod and said housing, and between said end-closure means and said housing; at least one opening in said housing for reception of a fluid source, said opening being located between said end-closure means and said piston rod;

a fluid confined within the space between said buffer-piston head and said first radially extending wall of said piston cylinder, inside said aperture in said buffer-piston rod, between said ejection rod and said buffer-piston cylinder, and between said ejection rod head, said end-closure means, and a fluid-pressure generating means, said fluid-pressure generating means for increasing fluid pressure within said housing to force said piston cylinder and said locking piston ring from their locking position to an unlocked position; and whereby pressure of the surrounding medium is applied to said end-closure piston which applies pressure to said confined fluid to balance pressures on said piston cylinder created by free flooding of said housing.

2. A pressure-balanced separation-nut device as claimed in claim 1 in which:
said seat member includes antirotational means thereon which prevents rotation of said nut assembly.

3. A pressure-balanced separation-nut device as claimed in claim 1 in which:
the face of said seat member tapers in accordance with radial distance from the longitudinal axis of said device,
the adjacent ends of said nut segments have a slope complementary to that of said seat member.

4. A pressure-balanced separation-nut device as claimed in claim 3 in which:
the face on the back end of said buffer-piston head tapers in accordance with radial distance from the longitudinal axis of said device, and
the end of said segmented nut adjacent said face on said buffer-piston head has a slope complementary to that of said face of said buffer-piston head.

5. A pressure-balanced separation-nut device as claimed in claim 1 which includes:
a piston-cylinder restraining means for forcing said piston-cylinder back into its locking position subsequent to release of said threaded element.

6. A pressure-balanced separation-nut device as claimed in claim 1 in which:
said fluid-pressure generating means is a piston and piston rod actuatable by the pressure of the surrounding medium.

7. A pressure-balanced separation-nut device as claimed in claim 6 in which:
fluid restriction means is connected with said fluid-pressure-producing means to insure slow action.

8. A pressure-balanced separation-nut device as claimed in claim 6 which includes:
a piston-cylinder restraining means for forcing said piston-cylinder back into its locking position subsequent to release of said threaded element.

* * * * *